US012681291B2

(12) United States Patent
Li et al.

(10) Patent No.: US 12,681,291 B2
(45) Date of Patent: Jul. 14, 2026

(54) LASER SCANNING SYSTEM

(71) Applicant: The Australian National University, Acton (AU)

(72) Inventors: Yongxiao Li, Acton (AU); Woei Ming Lee, Acton (AU); Yean Jin Lim, Acton (AU)

(73) Assignee: The Australian National University, Acton (AU)

( * ) Notice: Subject to any disclaimer, the term of this patent is extended or adjusted under 35 U.S.C. 154(b) by 915 days.

(21) Appl. No.: 17/788,601

(22) PCT Filed: Dec. 23, 2020

(86) PCT No.: PCT/AU2020/051418
§ 371 (c)(1),
(2) Date: Jun. 23, 2022

(87) PCT Pub. No.: WO2021/127733
PCT Pub. Date: Jul. 1, 2021

(65) Prior Publication Data
US 2023/0027700 A1 Jan. 26, 2023

(30) Foreign Application Priority Data
Dec. 24, 2019 (AU) ................................ 2019904929

(51) Int. Cl.
*G02B 26/08* (2006.01)
*G02B 21/00* (2006.01)
(Continued)

(52) U.S. Cl.
CPC ..... *G02B 26/0825* (2013.01); *G02B 21/0048* (2013.01); *G02B 26/101* (2013.01);
(Continued)

(58) Field of Classification Search
CPC .. G02B 26/0825; G02B 26/101; G02B 26/12; G02B 21/0048; G06T 7/0002; G06T 2207/10056
See application file for complete search history.

(56) References Cited

U.S. PATENT DOCUMENTS

2013/0181143 A1* 7/2013 Betzig ................ G02B 21/0032
250/459.1
2016/0302740 A1 10/2016 Iyer
(Continued)

FOREIGN PATENT DOCUMENTS

CN 106597373 A 4/2017
CN 109343033 A 2/2019
(Continued)

OTHER PUBLICATIONS

Tao, Xiaodong, et al. "Adaptive optics confocal microscopy using direct wavefront sensing." Optics letters 36.7 Apr. 1, 2011: pp. 1062-1064.
(Continued)

*Primary Examiner* — Yassin Alata
(74) *Attorney, Agent, or Firm* — DINSMORE & SHOHL LLP

(57) ABSTRACT
A method of scanning a laser over a field of view, the method comprising: providing a laser to produce the laser beam; rasterizing the laser beam over a first sub-area of the field of view; deflecting the laser beam to a second sub-area of the field of view; and rasterizing the laser beam over the second sub-area of the field of view; and capturing image information produced by the laser beam so that, for each sub-area of the field of view, the rasterized laser beam defines a plurality of image segments; for each segment calculating an image
(Continued)

correction and applying a correction to the laser according to the calculated image correction for the segment, and corresponding system.

20 Claims, 10 Drawing Sheets

(51) Int. Cl.
     G02B 26/10          (2006.01)
     G02B 26/12          (2006.01)
     G06T 7/00           (2017.01)
(52) U.S. Cl.
     CPC ........... G02B 26/12 (2013.01); G06T 7/0002
          (2013.01); *G06T 2207/10056* (2013.01)

(56) References Cited

U.S. PATENT DOCUMENTS

| | | | |
|---|---|---|---|
| 2017/0059840 A1 | 3/2017 | Tamano | |
| 2018/0113292 A1 | 4/2018 | Novikau et al. | |
| 2018/0136455 A1 | 5/2018 | Fujinuma | |
| 2019/0353912 A1 | 11/2019 | Chen et al. | |

FOREIGN PATENT DOCUMENTS

| | | |
|---|---|---|
| CN | 110595376 A | 12/2019 |
| DE | 102019003528 A1 | 11/2019 |
| JP | 2013109328 A | 6/2013 |
| JP | 2015219502 A | 12/2015 |
| JP | 2019536059 A | 12/2019 |
| KR | 101119815 B1 | 2/2012 |
| WO | 2012003938 A1 | 1/2012 |
| WO | 2013010151 A1 | 1/2013 |
| WO | 2016046012 A1 | 3/2016 |
| WO | 2017044969 A1 | 3/2017 |
| WO | 2019145889 A1 | 8/2019 |

OTHER PUBLICATIONS

International Patent-Type Search Report dated Dec. 24, 2019 pertaining to Australian Application No. 2019904929.
International Search Report and Written Opinion dated Jan. 25, 2021 pertaining to International PCT Application No. PCT/AU2020/051418.
Jian, Yifan, Wavefront sensorless adaptive optics optical coherence tomography for in vivo retinal imaging in mice, 2014 Optical Society of America, Feb. 1, 2014, vol. 5, No. 2, 13 pages.
Debarre, Delphine, Image-based adaptive optics for two-photon microscopy, Aug. 15, 2009, vol. 34, No. 16, Optics Letters, 3 pages.
Poland, Simon, Using adaptive optics for deep in-vivo Multiphoton FLIM, 7 pages, Multiphoton Microscopy in the Biomedical Sciences XI, Proc. of SPIE vol. 7903.
Office Action in Corresponding Japanese Application No. 2022-539553 Mailed Nov. 5, 2024, 8 pages.
Office Action mailed on Dec. 2, 2025 in corresponding Japanese Patent Application No. 2022-539353, 6 pages.

\* cited by examiner

Key:

52

102

LASER SCANNING SYSTEM

TECHNICAL FIELD

Embodiments relate to a laser scanning system for use in optical systems such as microscopes, laser lithography, laser writing, laser engraving and a corresponding method of laser scanning.

BACKGROUND

In any system where light or other electromagnetic radiation is manipulated, there are a number of factors which limit the ability of the system. For example, in optical systems, one of the most significant can be changes to refractive index at different locations in the sample. Other examples include optical distortions in the optical train (laser scanning units or field curvature). These changes can make it difficult to obtain the best result from the system over space and/or time.

"Adaptive optics" is the term which is often used to denote the use of one or more active optical components to correct for small changes to the optical characteristics affecting the system. Generally, this involves determining the extent of the optical aberration to be corrected, calculating a correction and then implementing that correction.

Different methods exist to determine the correction needed. One example relies on a wavefront detector, but this is prone to inaccuracies arising from out of focus light. Using wavefront sensors, the level of dark noise, background noise and cross talk between each detector on a 2D array can limit the performance of such systems.

Many existing corrective approaches are unable to adapt to sample distortions on the fly; being unable to achieve spatially varying aberration on the fly unless the scanning is paused or limited to a fixed scanning field.

SUMMARY OF THE DISCLOSURE

An embodiment provides a method of scanning a laser beam over a field of view, the method comprising:

providing a laser to produce the laser beam;

rasterizing the laser beam over a first sub-area of the field of view;

deflecting the laser beam to a second sub-area of the field of view;

rasterizing the laser beam over the second sub-area of the field of view; and capturing image information produced by the laser beam so that, for each sub-area of the field of view, the rasterized laser beam defines a plurality of image segments;

for each segment calculating an image correction and applying a correction to the laser according to the calculated image correction for the segment.

There may be a correction for each segment.

Each segment and each correction may be time registered. Time registration may comprise recording a relative time at which a segment is scanned. The relative time may establish a sequence of segments so that the correction to the laser can be applied for the corresponding segment when the corresponding segment is rasterized.

The method may further comprise the step of applying a correction at a time when a corresponding segment is being scanned by the laser.

The field of view may relate to a target. The method may comprise moving the target relative to one or more optical elements such as rasterizing mirrors. Alternatively, or in addition, the method may comprise moving the optical elements relative to the target. The optical elements may comprise an objective lens. The field of view may be defined for a given position of the target relative to the optical elements. Therefore, in embodiments, neither the target nor the optical elements are moved while the segments are scanned.

The time correlation between image segments and corrections may result in a time multiplexed approach to corrections. Use of a time multiplexing approach may facilitate a widening of the effective field of view for a given objective position. Use of a time multiplexing approach may facilitate improved laser intensity. By segmenting the field of view, different corrections for spatially disparate areas may be applied at different times.

Embodiments may provide for different corrections being applied for different optical characteristics of the system and/or different optical characteristics of the target.

Calculating an image correction may comprise deriving a wavefront mask. Each correction may comprise a corresponding wavefront mask.

Calculating an image correction may comprise, for each segment, applying an iterative image-based wavefront sensing loop. The loop may comprise a hill climbing algorithm applied to a measured intensity. The measured intensity may be measured for each segment. Calculating an image correction may comprise identifying Zernike modes for each segment and deriving one or more wavefront masks based on the identified Zernike modes.

Applying a correction may comprise adjusting a deformable mirror. The deformable mirror may be adjusted according to the corresponding wavefront mask.

The only optical correction applied may be applied by a deformable mirror.

Rasterizing the laser beam may comprise moving the laser beam in two directions. The laser beam may be moved in a first direction corresponding to an x-axis and in a second direction corresponding to a y-axis. The movement of the laser beam in the direction of the x-axis may be faster than the movement of the laser-beam in the y-axis. In embodiments, the x-axis and the y-axis are orthogonal to one another and lie in the plane of the target. The x-axis and the y-axis may be arbitrarily chosen as, in embodiments, there are no differences in the optical characteristics of the system in the plane of the target.

Deflecting the laser beam to a second sub-area of the field of view may comprise deflecting the laser beam in a direction of the y-axis.

The deformable mirror may be synchronized with movement of the laser beam in the y-axis. Therefore, embodiments may not require a high speed deformable mirror to achieve aberration correction at video frame rates (about 20 frames per second with a dwell time of about 5 μs). In an embodiment, the deformable mirror is able to implement 200 waveform masks per second. The deformable mirror may have between 30 and 50 actuators. In an embodiment, the deformable mirror may have about 40 actuators. The synchronization may comprise saving the captured image information together with a time at which the image information is captured. The correction to the laser may then be applied at a corresponding time when the segment is rasterized to apply the correction to the image information corresponding to the segment. It is to be realised that by comparing relative timings for image information corresponding to all segments, the system is able to determine the sequence and timing to apply each correction to the laser.

In embodiments, an iterative approach is applied to calculating the image correction. The correction applied to the laser may be updated through each iteration.

Each sub-area may cover the same area of the field of view. Alternatively, the first sub-area may cover a different area of the field of view to the second sub-area.

A further embodiment provides a system for scanning a laser beam over a field of view, the system comprising:

a laser for producing the laser beam;

a first moveable deflector for rasterizing the laser beam over a first sub-area of the field of view;

a second moveable deflector for deflecting the laser beam so that the first moveable deflector rasterizes a second sub-area of the field of view;

an image digitiser for digitising image information produced by the laser beam interacting with a target;

a computer processor for capturing image information produced by the image digitiser so that, for each sub-area of the field of view, the rasterized laser beam defines a plurality of image segments, wherein the computer processor calculates an image correction for each segment, the system further comprising an optical correction element for applying a correction to the laser beam according to the calculated image corrections.

The system may comprise three moveable deflectors for rasterising the sub-area. The moveable deflectors may consist of three scanning mirrors. The system may comprise a spinning polygon mirror and two galvanic mirrors. The first moveable deflector for rasterizing the laser beam over a sub-area of the field of view may comprise a spinning polygon mirror and a first galvanic mirror. The second moveable deflector for deflecting the laser beam to rasterize a second sub-area of the field of view may comprise a second galvanic mirror.

The field of view may relate to a target. The target may be moveable relative to one or more optical elements such as rasterizing mirrors. Alternatively, or in addition, the optical elements may be moveable relative to the target. The optical elements may comprise an objective lens. The field of view may be defined for a given position of the target relative to the optical elements. Therefore, in embodiments, neither the target nor the optical elements are moved while the segments are scanned.

Rasterizing the laser beam may comprise moving the laser beam in two directions. The laser beam may be moved in a first direction corresponding to an x-axis and in a second direction corresponding to a y-axis. The movement of the laser beam in the direction of the x-axis may be faster than the movement of the laser-beam in the y-axis during rasterization.

During rasterization, the spinning polygon mirror may move the laser beam in the x-axis and the first galvanic mirror may move the laser beam in the y-axis. The x-axis and the y-axis may be orthogonal to one another.

Movement of the second galvanic mirror may deflect the laser beam in a direction in the y-axis, thereby deflecting the laser beam to the second sub-area of the field of view.

The processor may calculate an image correction for each segment. The image correction may be a calculated wavefront mask.

The processor may apply a time stamp to each segment and each correction.

The processor may apply a correction at a time when a corresponding segment is being scanned by the laser.

The time correlation between image segments and corrections may result in a time multiplexed approach to corrections. Use of a time multiplexing approach may facilitate a widening of the effective field of view for a given objective position. By segmenting the field of view, different corrections for spatially disparate areas may be applied at different times.

Embodiments may provide for different corrections being applied for different optical characteristics of the system.

Calculating an image correction may comprise deriving a wavefront mask. Each correction may comprise a corresponding wavefront mask.

Embodiments may improve imaging performance, e.g. the point spread function, space bandwidth product and/or fluorescence intensity may be improved compared to known arrangements without optically splitting the detection signal. Therefore, embodiments may not be limited by the sensitivity of wavefront detectors or the number of image splitters.

Calculating an image correction may comprise, for each segment, applying an iterative image-based wavefront sensing loop. The loop may comprise a hill climbing algorithm. Calculating an image correction may comprise identifying Zernike modes for each segment and deriving one or more wavefront masks based on the identified Zernike modes.

The optical correction element may comprise a deformable mirror. The deformable mirror may be adapted to be adjusted by the processor according to the corresponding wavefront mask.

The optical correction element may consist of a deformable mirror. The system may include only one deformable mirror or other adaptive optical element. The deformable mirror may be a low resolution deformable mirror. The deformable mirror may be a high speed deformable mirror. In an embodiment, the deformable mirror is adapted to implement 200 waveform masks per second. The deformable mirror may have between 30 and 50 actuators. In an embodiment, the deformable mirror may have about 40 actuators.

Embodiments may extend an imaging field of view with complete or almost complete recovery of the point spread function.

The optical correction element may comprise a digital micro mirror and/or a spatial light modulator.

The deformable mirror may be synchronized with movement of the laser beam in the y-axis. Alternatively, the deformable mirror may be synchronized with movement in the x-axis. Therefore, embodiments may not require a high speed deformable mirror to achieve aberration correction at video frame rates (about 20 frames per second with a dwell time of about 5 μs).

Each sub-area may cover the same area of the field of view. Alternatively, the first sub-area may cover a different area of the field of view to the second sub-area.

A further embodiment comprises a method of scanning a laser beam over a field of view, comprising the steps of:

sequentially raster scanning the laser beam within a plurality of sub-areas of the field of view, wherein the sub-areas are arranged in a first direction of the field of view;

for each sub-area, defining a plurality of image segments, wherein the image segments of a particular sub-area are arranged in a second direction of the field of view perpendicular to the first direction;

capturing image information for each image segment, the image information associated with illumination of the field of view by the laser beam;

calculating, for each segment, an image correction, wherein the image correction is configured to enable a correction to the laser beam when the laser beam is subsequently raster scanned over the corresponding segment.

Another further embodiment comprises a system for scanning a laser over a field of view, the system comprising:

a laser for producing a laser beam;

a first movable deflector for raster scanning the laser beam;

a second movable deflector for deflecting the laser beam to sequentially raster scan a plurality of sub-areas of the field of view, wherein the sub-areas are arranged in a first direction of the field of view;

an image capture means configured to capture image information for each image segment, the image information associated with illumination of the field of view by the laser beam a processor configured to:

for each sub-area, define a plurality of image segments, wherein the image segments of a particular sub-area are arranged in a second direction of the field of view perpendicular to the first direction;

capture image information for each image segment, the image information associated with illumination of the field of view by the laser beam;

calculate, for each segment, an image correction, wherein the image correction is configured to enable a correction to the laser beam when the laser beam is subsequently raster scanned over the corresponding segment.

Embodiments may be retrofitted to existing laser scanning systems.

DESCRIPTION OF THE DRAWINGS

Embodiments are herein described, with reference to the accompanying drawings in which.

DETAILED DESCRIPTION OF SPECIFIC EMBODIMENT

Figure 1:
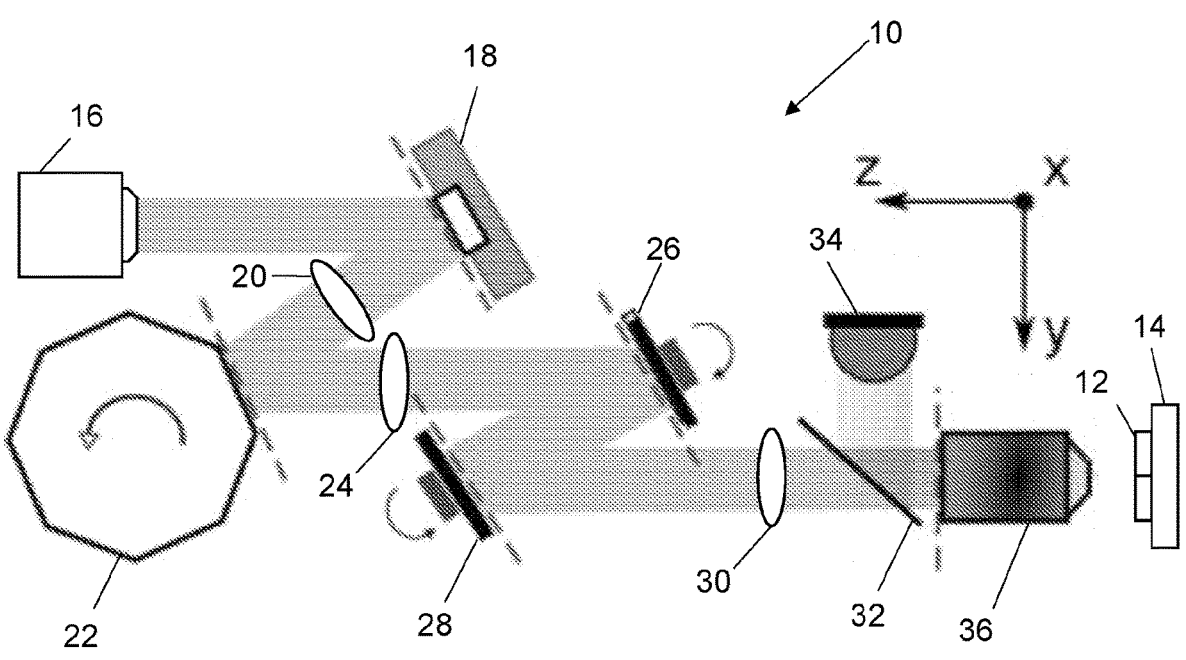
FIG. 1 is a schematic illustration of optical elements of a laser scanning microscope according to an embodiment.

FIG. 1 illustrates a laser scanning microscope 10. The laser scanning microscope 10 is used to image a sample 12 on a sample stage 14 at a target by directing a laser beam through the optical elements of the microscope onto the sample 12 and collecting the image information using a photomultiplier tube 34. Although this embodiment makes use of a photomultiplier tube 34, it is to be realised that any other device for converting optical information into electronic information could be used instead.

The microscope 10 includes a laser 16 which generates a laser beam, as illustrated. A deformable mirror 18 is used to apply wavefront masks to correct optical aberrations in the microscope 10, target holding the sample 12 in use, and/or surrounding environment. It is to be realised that embodiments relate to adaptive optics and the aspects of embodiments which are known from the field of adaptive optics will not be described herein in detail.

A polygon scanning mirror 22 is used to scan the laser beam in a manner as described below. Two galvanic mirrors 26 and 28 are also used to change the position of the laser beam relative to the target 12. Y-axis galvanic mirror 26 changes the orientation of the laser beam in the y-axis (vertically in the plane of the drawing of FIG. 1) whereas x-axis galvanic mirror 28 changes the orientation of the laser beam in the x-axis (in and out of the plane of the drawing of FIG. 1).

In the embodiment shown, the microscope 10 includes three sets of telescoping lenses 20, 24 and 30 which focus and direct the laser beam. A filter 32 (in this embodiment a dichroic long-pass filter) reflects an emitted fluorescent signal onto photomultiplier tubes 34. An objective lens 36 focuses the laser beam which has passed through the optical elements of the microscope 10 to the target 12. The image information is then captured by the photomultiplier tube 34.

It is to be realised that the laser scanning microscope 10 illustrated in FIG. 1 is only an example of an application of the invention. As is to be realised, further embodiments find application in other types of microscopes and, as described below, in fields other than microscopy.

Figure 2:
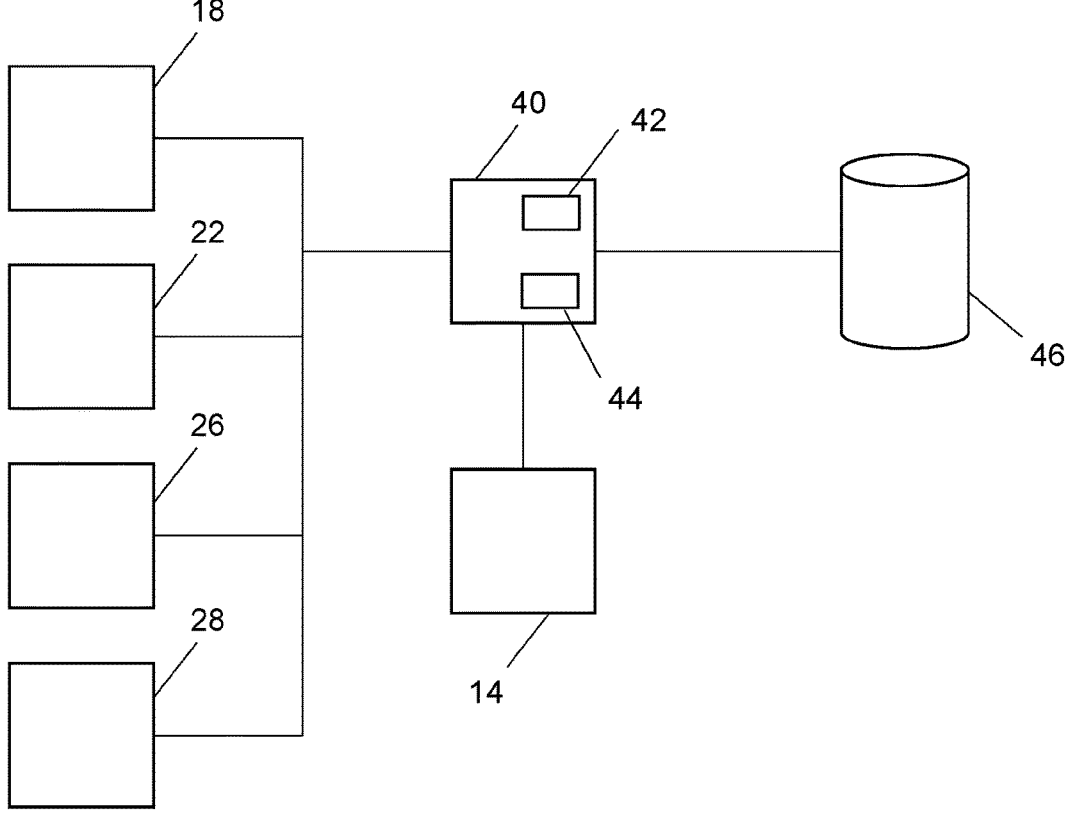
FIG. 2 is a schematic illustration of the electronic components of the laser scanning microscope of FIG. 1.

FIG. 2 illustrates the electronic elements of the microscope 10. The deformable mirror 18, polygon mirror 22 and galvanic mirrors 26 and 28 are connected to a processor 40 (for example in the form of a personal computing unit). The processor 40 includes a central processing unit 42 which is attached to a clock 44. The processor 40 is attached to a storage device 46 used for storing information. The photomultiplier tube 34 is connected to the processor 40 so that image information captured by the photomultiplier tube 34 can be manipulated by the processor and stored on the storage device 46.

The processor 40 and other electronic elements depicted in FIG. 2 are shown in schematic form only. So, for example, the clock 44 may be provided as part of the central processing unit 42 or may be provided separate thereto. Furthermore, it is to be realised that the processor 40 and storage device 46 may, instead be provided at a separate location connected to the microscope 10 via a network and may, as a further example, be provided as cloud computing.

The clock 44 provides a timing mechanism so that image information as well as the relative positions of the polygon mirror 22 and galvanic mirrors 26 and 28, and the operation of deformable mirror 18, can be synchronised in the manner described below.

Figure 3:
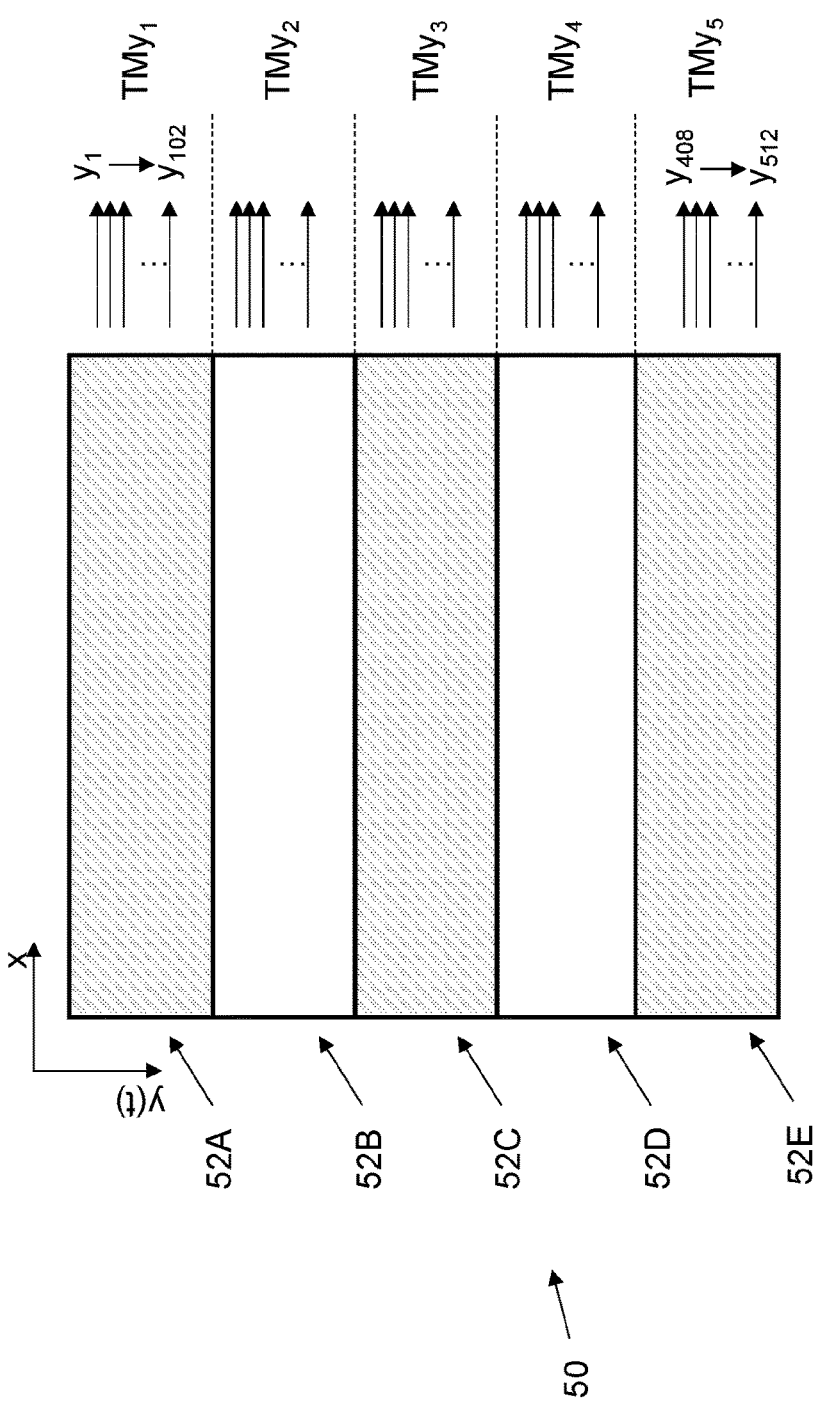
FIG. 3 illustrates segmentation of an image of a field of view of the laser scanning microscope of FIG. 1.

FIG. 3 illustrates scanned image information representing a sub-area or portion 50 of the field of view provided by the objective lens 36. As illustrated, the portion 50 has an x-axis (horizontal) and y-axis (vertical). The spinning polygon mirror 22 scans the laser beam in the x-axis and the Y-axis galvanic mirror 26 scans the laser beam in the y-axis. Therefore, the scanned image information of the sub-area 50 comprises a number of rows of scanned image information forming a particular column. The sub-area 50 is therefore raster scanned with the laser by the combined actions of the spinning polygon mirror 22 and the Y-axis galvanic mirror 26.

Embodiments of the invention then define segments 52 of the sub-area 50 by grouping a number of these scanned rows together. In the embodiment illustrated in FIG. 3, there are five segments 52A, 52B, 52C, 52D and 52E. As illustrated, each segment 52 is comprised of a plurality of scanned rows. For example, segment 52A is taken as rows 1 to 102 whereas segment 52E is taken as rows 409 to 512, with the intermediate rows being assigned to the remaining segments 52B, 52C and 52D. Preferably, adjacent segments 52 are bounded between adjacent rows—for example, segment 52A ends at row 102 and segment 52B begins at row 103, and the segments 52 therefore cover the entire sub-area 50.

Figure 6:
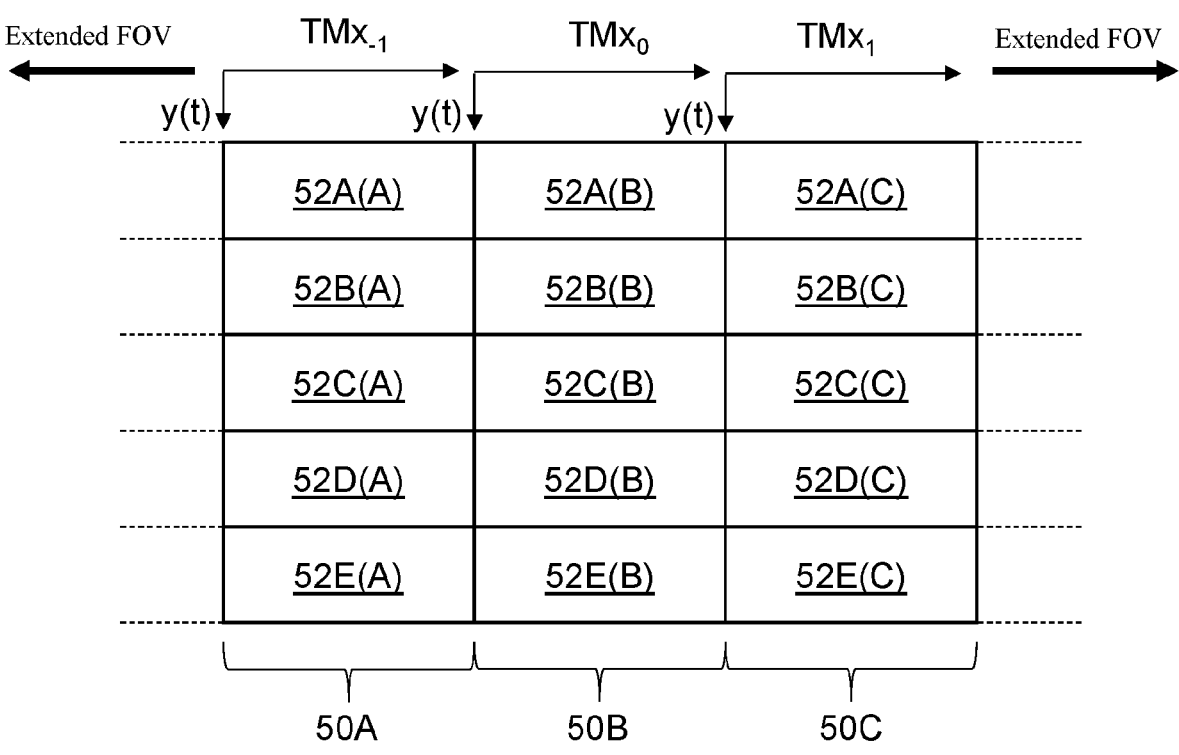
FIG. 6 illustrates further segmentation of a field of view of the laser scanning microscope of FIG. 1.

According to an embodiment, during the scanning process to define sub-area 50, X-axis galvanic mirror 28 will remain stationary. However, once the scanning process reaches the bottom of the column of sub-area 50, the galvanic mirror 28 will move the laser beam to an adjacent sub-area 50 and the laser beam will then scan the adjacent sub-area, as described in more detail below with reference to FIG. 6. In FIG. 6, there is shown sub-areas 50A, 50B, and 50C, each with five segments 52A(A) to 52F(C)—a particular segment 52 is therefore associated, in the figure, with a row and a column, the value in parenthesise represents the particular sub-area 50A-50C.

Figure 4:
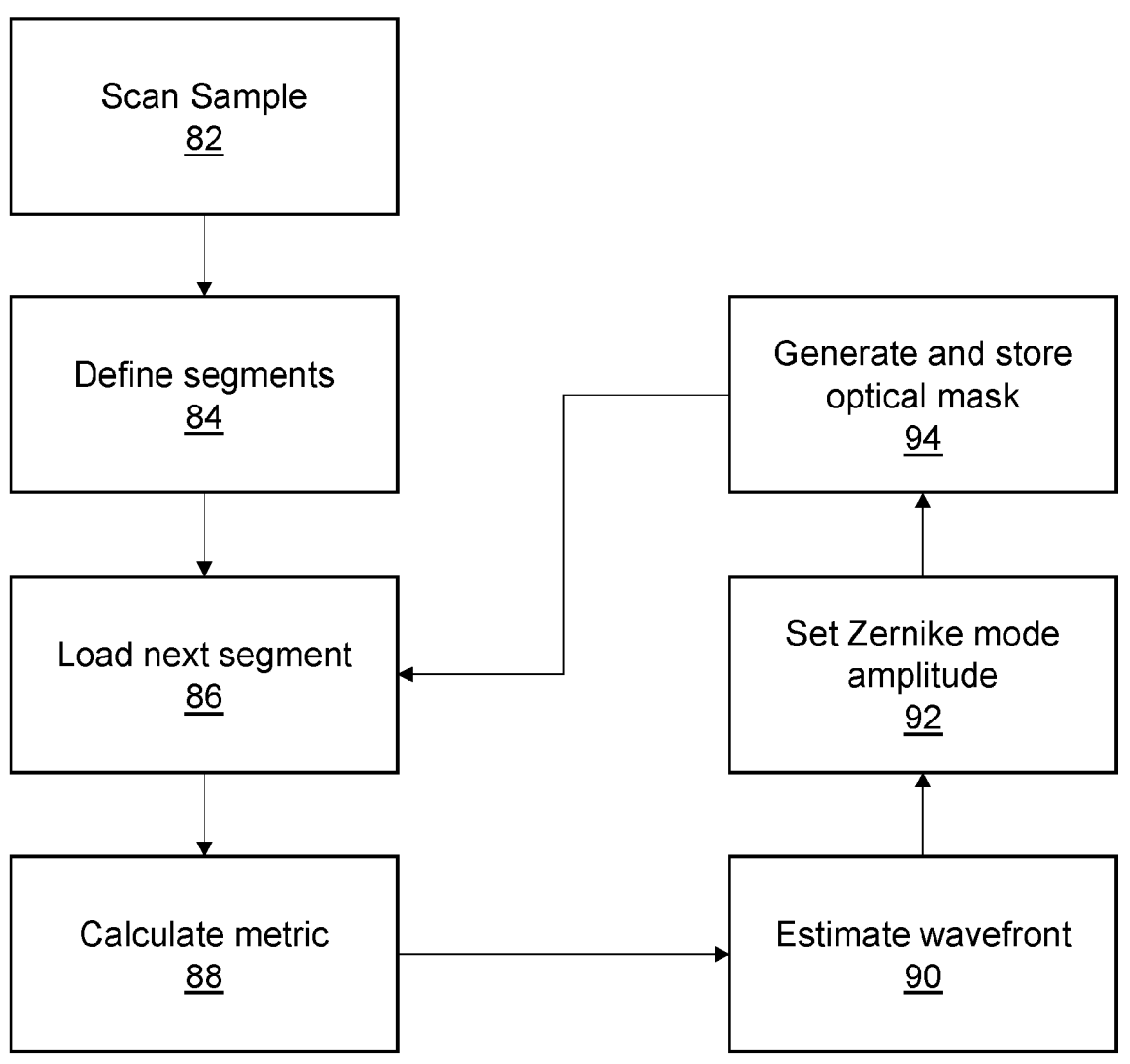
FIG. 4 illustrates a method of scanning a laser according to an embodiment.

FIG. 4 illustrates a method 80 of scanning a laser using the scanning laser microscope 10 illustrated in FIG. 1. At an initial step, step 82, the sample is scanned with a laser beam and the corresponding image information stored in the storage device 46. During this step, the rotating polygon mirror 22 and the galvanic mirrors 26 and 28 cooperate to scan the field of view provided by the objective lens 36 by scanning multiple, adjacent columns as described above.

In an embodiment, the field of view is defined by the objective lens 36 which focuses the laser beam onto the sample 12. The field of view is provided for a given position of the objective lens 36.

In the following step, step 84, the segments are defined. In this step, the number of scanning rows to allocate to a segment is determined. This step may also include a determination of how much of the potential field of view should be processed. The definition of the segment size will determine the relative speeds of the spinning polygon mirror 22 and the galvanic mirrors 26 and 28. At the time that the image information for each segment is digitised and stored, a time stamp, as provided by the clock 44, will be stored for that segment. This allows the later synchronisation of corrections for each segment.

It is to be realised that the segment size may be chosen depending on the optical characteristics of the target and/or the system. In particular, the segment size may be varied in order to find an optimum correction for the field of view under consideration. Therefore, the segment size may be altered whilst rasterizing.

At step 86, processing of the segments is commenced. This process will begin with the first segment and iteratively load the next segment until all segments have been processed. At step 88 the metric (which in this case is the intensity) is calculated and at the following step, step 90, the wavefront is estimated using a hill climbing algorithm. The hill climbing is achieved by moving through the first 13 orders of Zernike modes (not including tip, tilt and piston), from low (Z4) to high (Z15) to identify the optimal set of Zernike mask for each correction; each step, a 0.05 step value of the Zernike amplitudes. The optimization accounts for measured intensity (higher being better) but does not consider the gradient between each point (difference between each measurement).

It is to be realised that the step value may be changed to meet specific requirements.

At step 92 the Zernike mode amplitude is set. At step 94 the wavefront mask corresponding to the current segment is generated and stored in the storage device 46. Therefore, calculating an image correction comprises, for each segment, applying an iterative image-based wavefront sensing loop.

The process will then return to step 86 where the next segment is considered, and the process will again cycle through steps 88, 90, 92 and 94 to generate the wavefront mask for the next segment. In this manner, wavefront masks for each of the segments are generated.

Figure 5:
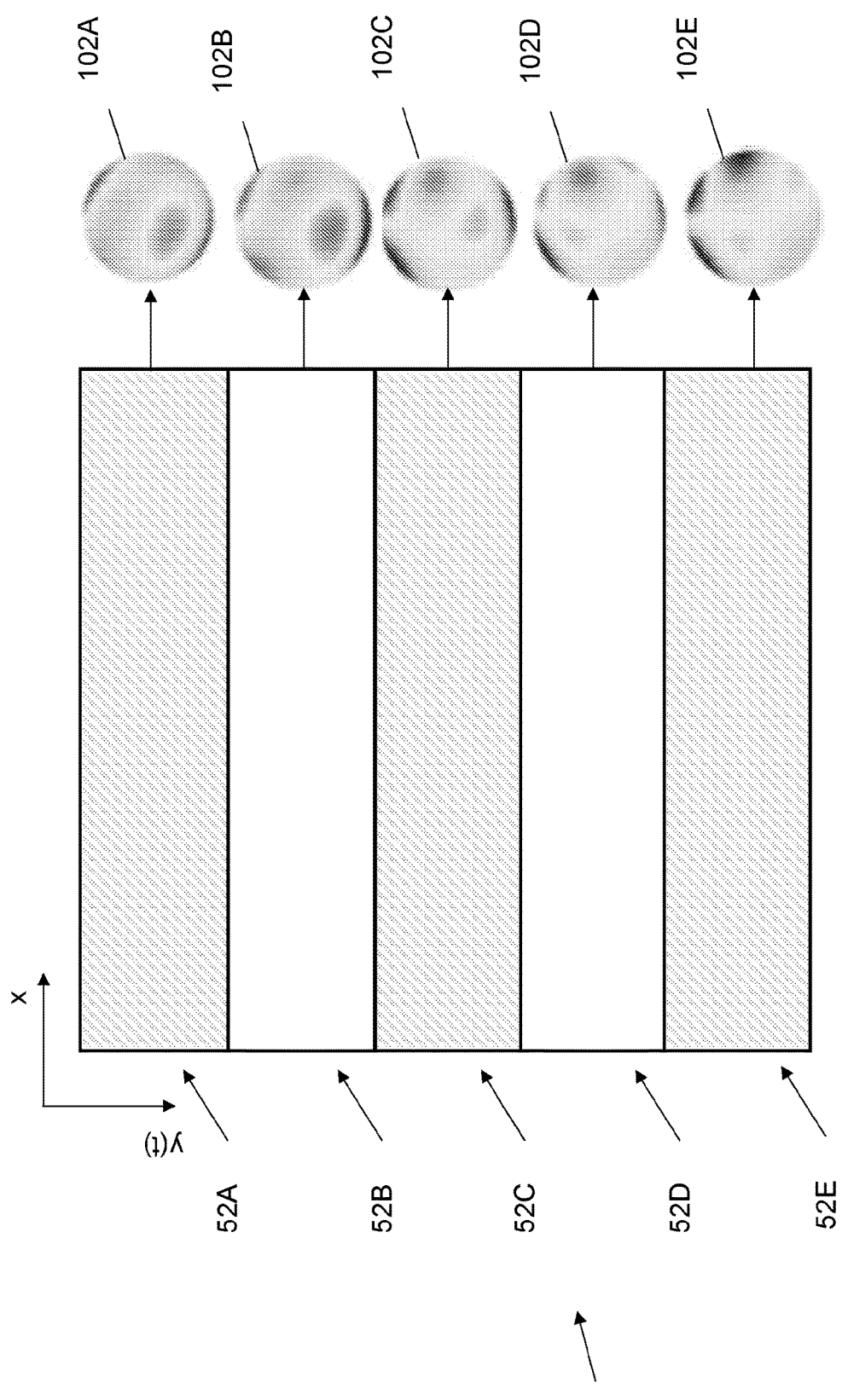
FIG. 5 illustrates a correlation between image segments and wavefront masks according to an embodiment.

During operation, the sample will be continually scanned. Therefore, when the processor determines that a segment is being scanned for which a wavefront mask has been previously generated and stored, the processor will use that wavefront mask to deform the deformable mirror, thereby applying the wavefront mask to correct aberrations for that segment. As illustrated in FIG. 5, wavefront masks 102A, 102B, 102C, 102D, and 102E correspond to segments 52A, 52B, 52C, 52D, and 52E.

In an embodiment, for each segment 52, the determined wavefront mask 102 is continuously updated during each scan. For example, a segment 52 can be imaged using a calculated wavefront mask 102 to produce an output (e.g to a display or datastore). This newly obtained image of the segment 52 can also be utilised to determine a new wavefront mask 102 (as according to embodiments herein described). Advantageously, this newly determined wavefront mask 102 may produce a more accurate correction as it determined from the image produced with the earlier wavefront mask 102. Such a corrective process may be ongoing during imaging of the sample 12—it can be expected that in most cases the resulting image will continuously be improved as a result, although with smaller improvements for subsequent captures. After some number of updates, a maximum effective correction may be obtained.

FIG. 6 illustrates the manner in which the scan sub-area 50 is offset. The middle column corresponds to the sub-area 50 described above and illustrated in FIG. 3. The X-axis galvanic mirror 28 is controlled to provide an offset in the x-axis, thereby defining different sub-areas 50. For example, sub-area 50A is offset with respect to sub-area 50B which itself is offset with respect to sub-area 50C. By applying a series of offsets, the system is able to advantageously extend the effective field of view scanned. This is because it is expected that different corrections via the deformable mirror 18 will be required over the extent of the field of view in the x-direction. This is similar to the different corrections required in the y-direction, however, the y-direction differences are naturally accounted for due to the raster scanning direction. Advantageously, by dividing the x-axis into different sub-areas 50, the field of view in both x- and y-directions can be sufficiently corrected to enable improved imaging of the sample 12.

Figure 7:
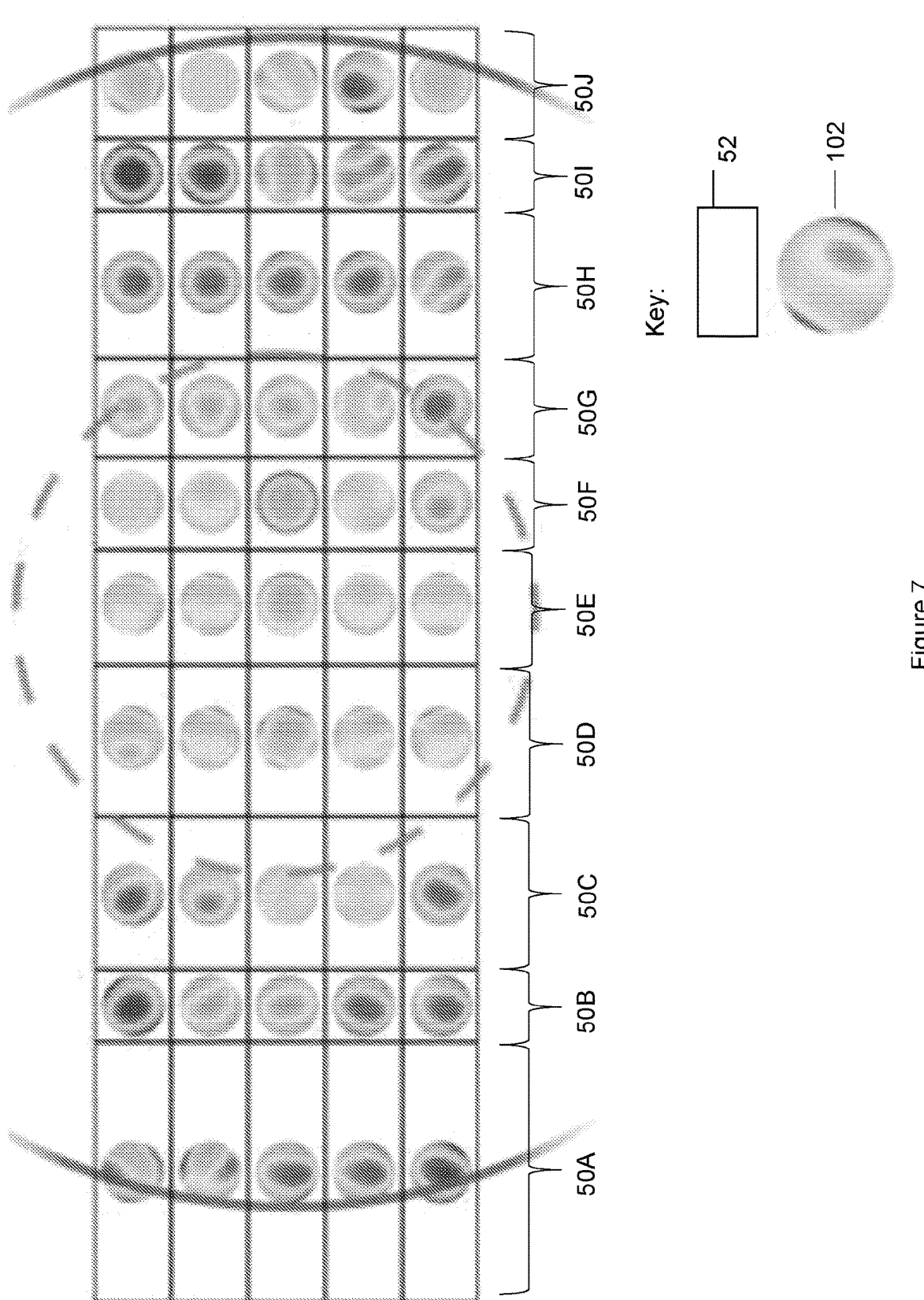
FIG. 7 shows a plurality of segments and sub-areas of the field of view, and calculated wavefront masks for each.

FIG. 7 shows an example in which a plurality of sub-areas 50A-50J are defined in a two-dimensional grid. As shown, each sub-area 50A-50J comprises five segments 52, therefore, as a result, there are fifty segments 52. Each segment 52 is shown with a calculated wavefront mask 102—as can be seen, each segment 52 has a unique wavefront mask 102 which will depend upon the particular distortions in corresponding imaging areas.

FIG. 7 shows an advantage whereby a relatively large area is imagable (i.e. the field of view is relatively high), with the field of view divided into discrete areas (i.e. segments 52) in which a unique wavefront mask 102 can be determined. An advantage of the invention may be that a balance is struck between a number of determined wavefronts masks 102 and a speed of operation—for example, a discrete number of unique wavefront masks 102 may advantageously allow for useful adaptive optics corrections while maintaining video-level frame rates (e.g. 20 frames per second).

As shown in FIG. 7, the sizes (i.e. extent within the field of view) of each segment 52 can vary. For example, segment 52A is of a different size to segment 52B. In the figure, segment sizes vary in the x-direction, essentially corresponding to the length of a line (i.e. laser scan) when raster scanning. In an embodiment, the number of lines per segment 52 can also be varied—i.e. thereby changing the size in the y-direction. In an embodiment, variations in line length and number of lines can be applied to each segment 52, thereby enabling variability in size of segments 52 in both the x- and y-directions.

Figure 8:
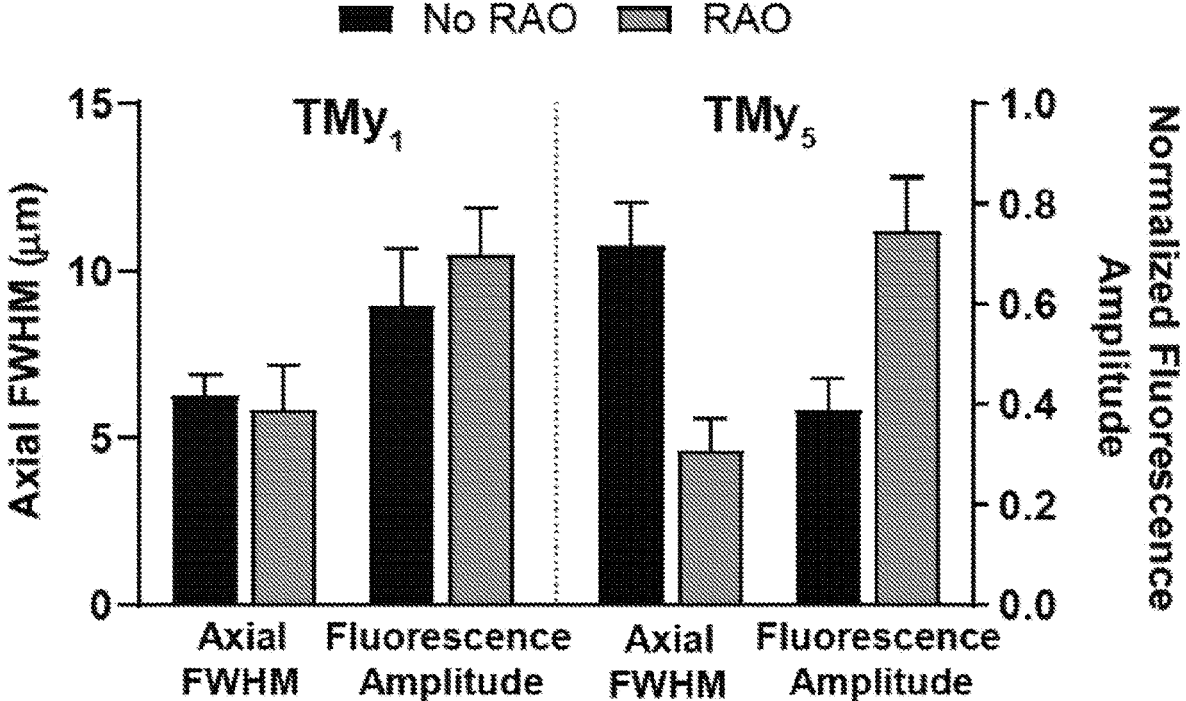
FIG. 8 shows the effect of different wavefront corrections for different segments.

FIG. 8 illustrates a different amount of improvement measured for two segments 52 TMy1 and TMy5. Here, a lower "Axial FWHM" ("full width at half maximum") indicates a better resolution thus improved result and a higher fluorescence amplitude indicates an improved result. For both TMy1 and TMy5, each measured parameter is improved according to wavefront correction ("RAO") compared to the non-wavefront corrected case ("No RAO"), however, in the case of TMy5, the improvement is much more marked. For the actual sample measured to produce FIG. 8, the wavefront correction required for TMy5 was more complex than that for TMy1 due to more complex aberrations.

Embodiments may operate at speeds comparable to video storage and playback (about 20 fps and dwell time of about 5 μs) for wavefront optimization of a selected segments, potentially without slowing down the scanning speed or reducing the region of interest.

Generally, when imaging a sample 12 using a laser scanning microscope 10, without corrections according to embodiments herein described, optical and sample aberrations result in a non-isoplanatic illumination field. Embodiments herein described may advantageously improve the illumination field towards an ideal isoplanatic illumination field—in particular, embodiments in which the wavefront masks 102 are continuously updated may provide changes to the wavefront masks 102 which effectively iterate towards an isoplanatic illumination field.

Figure 10:
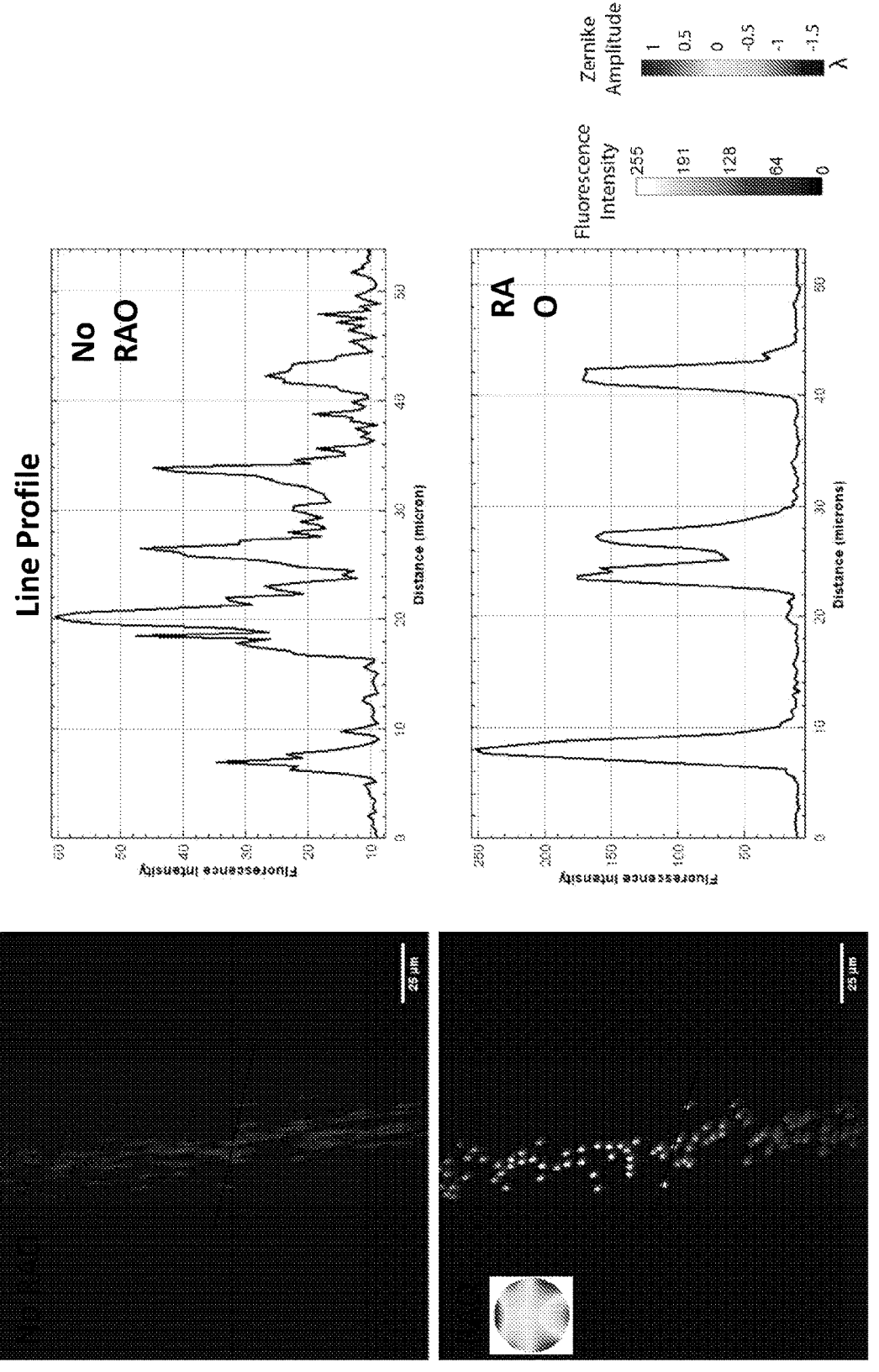
FIG. 10 shows improvements in intensity profile and resolution between non-corrected and corrected images of beads.

FIG. 10 shows plots of intensity of imaged beads suspended within a capillary tube. Top shows an uncorrected image of the beads, with the line profile of the right image corresponding to the line shown in the left image. Bottom shows a corrected image of the beads, with the line profile of the right image corresponding to the line shown in the left image. As can be seen, the peaks are more clearly defined in the corrected images and the line profile does not include erroneous peaks.

The effectiveness of embodiments (as measured, for example, by improvements in signal intensity) may be correlated with the number of segments; the greater the number of segments the greater the improvement in signal intensity, up to a threshold, beyond which improvement in intensity becomes difficult to quantify for an increased number of segments. However, increasing the number of segments also increases the processing resources required and the usability of embodiments can be reduced if there is a lag between wavefront mask generation and retrieval, particularly where a scanning objective lens is used. Therefore, for example, a trade-off may exist between a number of segments processed and a useful framerate.

Although an embodiment relating to a laser scanning microscope has been illustrated and discussed, it is to be realised that further embodiments find application outside the field of microscopy. For example, in the field of photolithography, laser scanning is used and it may be important during such processes to maximise the power of the laser over the field of view of the objective lens. The use of embodiments to such an application may extend the effective field of view of the objective and/or enhance the intensity of the laser, by applying different wavefront masks to different sub-areas or portions of the field of view. By extending the effective field of view of the objective, the movement of the stage or objective may be reduced, potentially improving accuracy. By enhancing the intensity of the laser, the lithographic or 'laser writing' process may be effectively applied to a broader range of materials and applications.

Figure 9A:
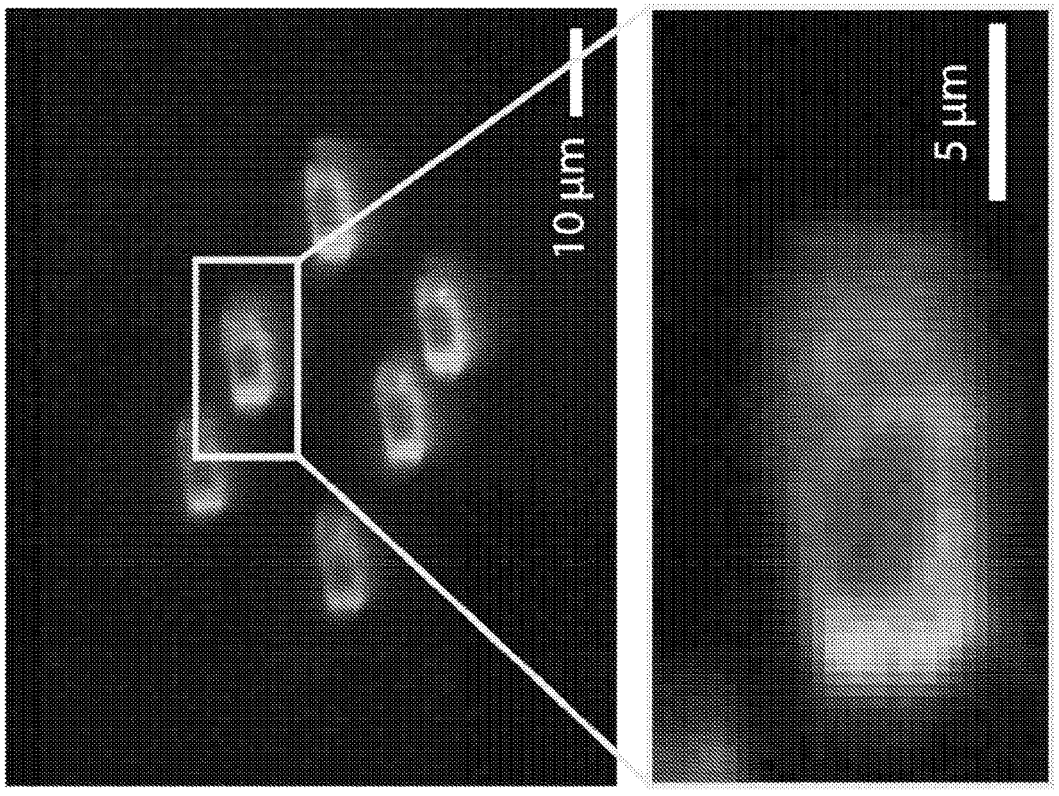
FIGS. 9A and 9B show a result of photolithography processes without correction (FIG. 9A) and with correction (FIG. 9B)
Figure 9B:
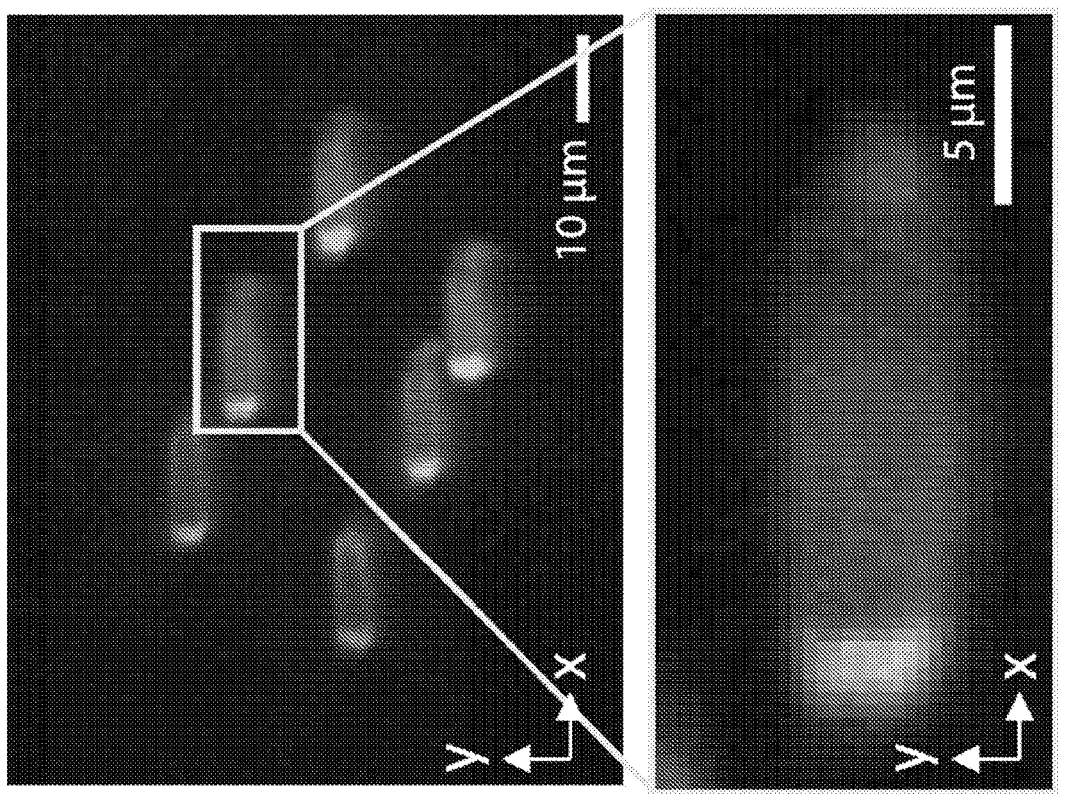
Figure 9C:
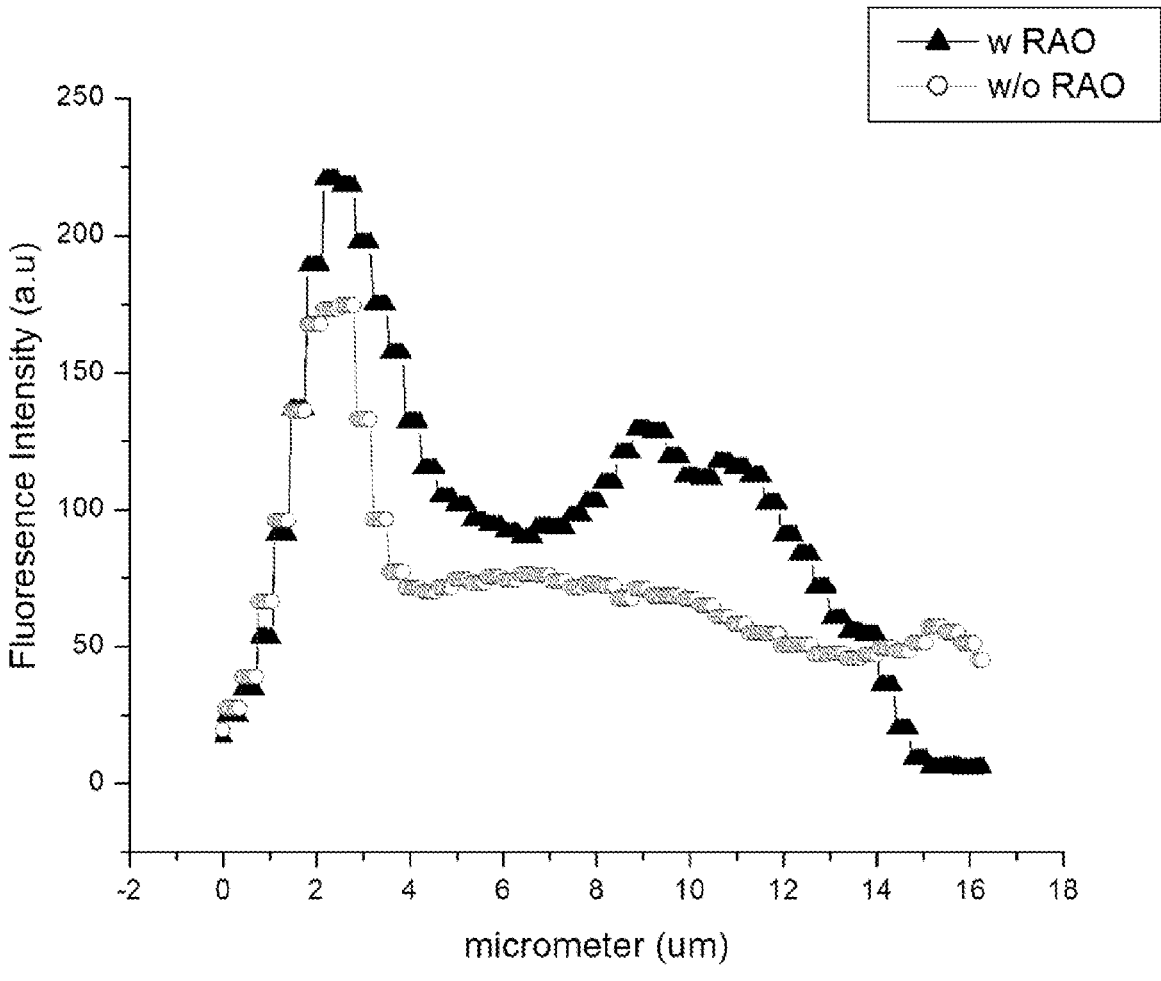
FIG. 9C shows intensity profiles for selected portions of FIGS. 9A and 9B.

FIGS. 9A and 9B show a result of 2-photon laser writing (i.e. photolithography) pattern formed in a fluorescent UV curable glue within a glass capillary tube. The figure shows the resulting cured glue under fluorescent conditions—the visible features correspond to a previous laser writing step. FIG. 9A shows an image of the result of laser writing without wavefront correction whereas FIG. 9B shows the result of writing with wavefront correction. The visible features of FIG. 9B show that the embodiments herein described for applying wavefront masks 102 to correct segments 52 of the field of view of the laser writing process corrects for the aberration caused by the curved glass capillary tube (when compared to FIG. 9A). The result in a less elongated lithography pattern in and more evenly distributed laser power which is indicated by the residual fluorescence intensity across each spot. FIG. 9C shows a plot of fluorescent intensity for the enlarged non-corrected laser written feature (FIG. 9A) and enlarged corrected laser written feature (FIG. 9B)—as can be seen, an over improvement in intensity and detail is shown for the corrected image. It should be noted that the wavefront correction is undertaken using a low power laser in order to determine the wavefront masks 102 for each segment 52. Subsequently, laser writing was performed using a sufficiently powered laser and the determined wavefront masks 102.

It is to be realised that further embodiments may find application in any system using a scanned laser. For example, in the fields of laser ablation and range finding.

It is to be understood that, if any prior art publication is referred to herein, such reference does not constitute an admission that the publication forms a part of the common general knowledge in the art, in Australia or any other country.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments. Similarly, the word "device" is used in a broad sense and is intended to cover the constituent parts provided as an integral whole as well as an instantiation where one or more of the constituent parts are provided separate to one another.

The invention claimed is:

1. A method of scanning a laser over a field of view, the method comprising:

providing a laser to produce a laser beam;

rasterizing the laser beam over a first sub-area of the field of view;

deflecting the laser beam to a second sub-area of the field of view;

rasterizing the laser beam over the second sub-area of the field of view;

capturing image information produced by the laser beam so that, for each sub-area of the field of view, the rasterized laser beam defines a plurality of image segments, wherein each of the first sub-area and the second sub-area comprises a number of rows of the image information, and wherein each of the image segments comprises a plurality of said rows;

for each image segment, calculating an image correction and applying a correction to the laser according to the calculated image correction for the image segment; and applying a time stamp to each correction and/or each image segment and providing a time correlation between the image segments and the corrections to provide a time multiplexed approach to corrections.

2. The method according to claim 1, further comprising the step of applying the correction at a time when the corresponding image segment is being scanned by the laser.

3. The method according to claim 1, wherein calculating an image correction comprises deriving a wavefront mask, wherein each correction comprises a corresponding wavefront mask.

4. The method according to claim 1, wherein calculating an image correction comprises, for each image segment, applying an iterative image-based wavefront sensing loop.

5. The method according to claim 1, wherein rasterizing the laser beam comprises moving the laser beam in a first direction corresponding to an x-axis and in a second direction corresponding to a y-axis, wherein the movement of the laser beam in the first direction of the x-axis is faster than the movement of the laser beam in the second direction of the y-axis.

6. The method according to claim 5, wherein deflecting the laser beam to the second sub-area of the field of view comprises deflecting the laser beam in a direction of the y-axis.

7. The method according to claim 5, wherein a deformable mirror is synchronized with movement of the laser beam in the y-axis.

8. The method according to claim 5, wherein each image segment is associated with a unique portion of the x-axis and the y-axis, such that the image segments substantially cover the field of view.

9. The method according to claim 1, further comprising time registering each of the image segments and each of the corrections.

10. A system for scanning a laser beam over a field of view, the system comprising:

a laser for producing the laser beam;

a first moveable deflector for rasterizing the laser beam over a first sub-area of the field of view;

a second moveable deflector for deflecting the laser beam so that the first moveable deflector rasterizes a second sub-area of the field of view;

an image digitizer for digitizing image information produced by the laser beam interacting with a target;

a computer processor for capturing image information produced by the image digitizer so that, for each sub-area of the field of view, the rasterized laser beam defines a plurality of image segments, wherein each of the first sub-area and the second sub-area comprises a number of rows of the image information, and wherein each of the image segments comprises a plurality of said rows, wherein the computer processor calculates an image correction for each image segment; and an optical correction element for applying a correction to the laser beam according to the calculated image corrections, wherein the system is adapted to:

apply a time stamp to each correction and/or each image segment; and provide a time correlation between the image segments and the corrections to provide a time multiplexed approach to corrections.

11. The system according to claim 10, wherein the first moveable deflector for rasterizing the laser beam over the sub-area of the field of view comprises a spinning polygon mirror and a first galvanic mirror; and wherein the second moveable deflector for deflecting the laser beam to rasterize a second sub-area of the field of view comprises a second galvanic mirror, and wherein the spinning polygon mirror moves the laser beam in an x-axis and the first galvanic mirror moves the laser beam in a y-axis.

12. The system according to claim 11, wherein movement of the second galvanic mirror deflects the laser beam in a direction in the y-axis, thereby deflecting the laser beam to the second sub-area of the field of view.

13. The system according to claim 10, wherein the computer processor calculates an image correction for each image segment.

14. The system according to claim 10, wherein the processor applies a time stamp to each image segment and each correction.

15. The system according to claim 10, wherein the optical correction element is a deformable mirror.

16. The system according to claim 15, wherein the deformable mirror is synchronized with movement of the laser beam in one of an x-axis or a y-axis.

17. A method of scanning a laser beam over a field of view, comprising the steps of:

sequentially raster scanning the laser beam within a plurality of sub-areas of the field of view, wherein the sub-areas are arranged in a first direction of the field of view;

for each sub-area, defining a plurality of image segments, wherein the image segments of a particular sub-area are arranged in a second direction of the field of view perpendicular to the first direction;

capturing image information for each image segment, the image information associated with illumination of the field of view by the laser beam, wherein each of a first sub-area and a second sub-area comprises a number of rows of the image information, and wherein each of the image segments comprises a plurality of said rows;

calculating, for each image segment, an image correction, wherein the image correction is configured to enable a correction to the laser beam when the laser beam is subsequently raster scanned over the corresponding image segment;

applying a time stamp to each correction and/or each image segment; and providing a time correlation between the image segments and the corrections to provide a time multiplexed approach to corrections.

18. A method as claimed in claim 17, further comprising the step of:

subsequently raster scanning the laser beam and, for each image segment, applying the calculated image correction to the laser beam using an optical correction element.

19. A system for scanning a laser beam over a field of view, the system comprising:

a laser for producing the laser beam;

a first movable deflector for raster scanning the laser beam;

a second movable deflector for deflecting the laser beam to sequentially raster scan a plurality of sub-areas of the field of view, wherein the sub-areas are arranged in a first direction of the field of view;

an image capture means configured to capture image information for each image segment, the image information associated with illumination of the field of view by the laser beam, wherein each of a first sub-area and a second sub-area comprises a number of rows of the image information, and wherein each of the image segments comprises a plurality of said rows; and a processor configured to:

for each sub-area, define a plurality of image segments, wherein the image segments of a particular sub-area are arranged in a second direction of the field of view perpendicular to the first direction;

capture image information for each image segment, the image information associated with illumination of the field of view by the laser beam;

calculate, for each image segment, an image correction, wherein the image correction is configured to enable a correction to the laser beam when the laser beam is subsequently raster scanned over the corresponding image segment;

apply a time stamp to each correction and/or each image segment; and calculate a time correlation between the image segments and the corrections to provide a time multiplexed approach to corrections.

20. A system as claimed in claim 19, further comprising an optical correction element for modifying the laser beam, wherein, when subsequently raster scanning the laser beam, the processor is configured to control the optical correction element such as to, for each image segment, apply the image calculated correction to the laser beam.

* * * * *